US011655127B2

United States Patent
Ceresoli et al.

(10) Patent No.: US 11,655,127 B2
(45) Date of Patent: May 23, 2023

(54) LOADING CRANE

(71) Applicant: FASSI GRU S.p.A., Albino (IT)

(72) Inventors: Rossano Ceresoli, Ranica (IT); Piantoni Giorgio, Vertova (IT)

(73) Assignee: Fassi Gru S.P.A., Albino (IT)

( * ) Notice: Subject to any disclaimer, the term of this patent is extended or adjusted under 35 U.S.C. 154(b) by 120 days.

(21) Appl. No.: 17/132,906

(22) Filed: Dec. 23, 2020

(65) Prior Publication Data
US 2021/0246001 A1 Aug. 12, 2021

(30) Foreign Application Priority Data
Feb. 6, 2020 (IT) .......................... 102020000002362

(51) Int. Cl.
| | | |
|---|---|---|
| *B66C 13/14* | (2006.01) | |
| *F16L 11/00* | (2006.01) | |
| *B66C 23/00* | (2006.01) | |

(52) U.S. Cl.
CPC .............. *B66C 13/14* (2013.01); *B66C 23/54* (2013.01); *F16L 11/00* (2013.01)

(58) Field of Classification Search
CPC ........... B66C 13/14; B66C 23/54; F16L 11/00
See application file for complete search history.

(56) References Cited

U.S. PATENT DOCUMENTS

| | | | | |
|---|---|---|---|---|
| 3,893,480 A | * | 7/1975 | Dunbar ................... | B66C 13/14 137/355.17 |
| 4,034,875 A | * | 7/1977 | Pugh ...................... | B66F 9/0655 414/718 |
| 4,360,077 A | * | 11/1982 | Abbott .................. | B66F 11/046 182/2.11 |
| 5,494,397 A | * | 2/1996 | Wilson ................... | B66C 13/14 52/115 |
| 9,452,913 B2 | * | 9/2016 | Dell'Aquila ............ | B66C 13/12 |

* cited by examiner

*Primary Examiner* — Sang K Kim
*Assistant Examiner* — Nathaniel L Adams
(74) *Attorney, Agent, or Firm* — Mark Malek; Widerman Malek, PL

(57) ABSTRACT

The present invention refers to loading crane comprising:
an articulated arm, comprising at least one first and one second bodies successively connected in order to form an open kinematic chain, wherein the second body is translatingly and/or rotatably movable with respect to the first body;
a hydraulic circuit adapted to convey a working fluid for actuating the articulated arm.
Said hydraulic circuit comprises a segment associated to one of the first and second bodies comprising:
at least one sliding rigid tube slidingly translatingly connected to the body to which the segment of the hydraulic circuit is associated;
at least one stationary tube integrally connected to the body to which the segment of the hydraulic circuit is associated;
a flexible tube fluidically interconnecting the sliding rigid tube and the stationary tube.

11 Claims, 4 Drawing Sheets

LOADING CRANE

RELATED APPLICATIONS

This application is a U.S. utility patent application and claims benefit to Italian Application No. 102020000002362 on Feb. 6, 2020 and titled LOADING CRANE. The content of this application is incorporated herein by reference.

TECHNICAL FIELD OF THE INVENTION

The present invention refers to a loading crane, particularly to a hydraulic articulated loading crane provided with an improved hydraulic circuit.

PRIOR ART

A loading crane comprises a plurality of arms, successively connected to each other, each being capable of performing a translating and/or rotative movement with respect to a preceding arm. Such motions are commanded by hydraulic actuators requiring a hydraulic circuit conveying a working fluid, typically a pressurized oil, to the actuators themselves. The hydraulic circuit comprises flexible tubes, capable of deforming due to the relative movements of the crane arms.

Referring for example to a main arm 2 and secondary arm 3 of a crane 1, wherein the secondary arm is capable of rotating with respect to the main arm (FIGS. 1A-1C), the hydraulic circuit comprises at least a flexible tube 4 arranged in proximity of the relative rotation axis between the main arm 2 and secondary arm 3. Such flexible tube 4 in turn connects further segments of the hydraulic circuit fixedly connected respectively to the main arm 2 and secondary arm 3. Due to the relative rotations between the main arm 2 and the secondary arm 3, the ends of such circuit segments associated to the main arm and secondary arm draw apart from and approach to each other and, as a consequence, the above-cited flexible tube 4, which connects them, warps. Obviously, the flexible tube 4 must be sized in order to connect the two circuit segments associated to the main arm and secondary arm when the distance from each other is the longest (FIG. 1C). Consequently, when, on the contrary, the distance from each other is the shortest (FIG. 1A), the flexible tube 4 takes the shape of a curved segment projecting with respect to the relative rotation axis of the crane arms, which could become dangerous since the tube can be caught by objects present in the environment where the crane operates (for example: tree branches, streetlamps, lamp posts, etcetera).

Patent documents FR 2499051 A1 and EP 2947037 A1 describe hydraulic cranes provided with means to overcome the above-cited problem.

Document U.S. Pat. No. 3,893,480 describes a further hydraulic crane according to the prior art.

SUMMARY OF THE INVENTION

Therefore, it is an object of the present invention to make available a loading crane having a hydraulic circuit configured as an alternative to what was available in the state of the art, in order to reduce the size of the flexible tubes in proximity of the interface between consecutive arms due to variations to the relative position of these latter.

This and other objects are met by a loading crane comprising an articulated arm, comprising at least one first and one second bodies successively connected in order to form an open kinematic chain, wherein the second body is translatingly and/or rotatably movable with respect to the first body. The loading crane also includes a hydraulic circuit adapted to convey a working fluid for actuating the articulated arm. The hydraulic circuit comprises a segment associated to one of the first and second bodies. The segment comprises at least one sliding rigid tube slidingly translatingly connected to the body to which the segment of the hydraulic circuit is associated; at least one stationary tube integrally connected to the body to which the segment of the hydraulic circuit is associated; and a flexible tube fluidically interconnecting the sliding rigid tube and the stationary tube.

BRIEF DESCRIPTION OF THE FIGURES

In order to gain a better comprehension of the invention and appreciate the advantages thereof, some exemplifying non-limiting embodiments thereof will be described in the following with reference to the attached figures, in which.

DETAILED DESCRIPTION OF THE INVENTION

Figure 1A:
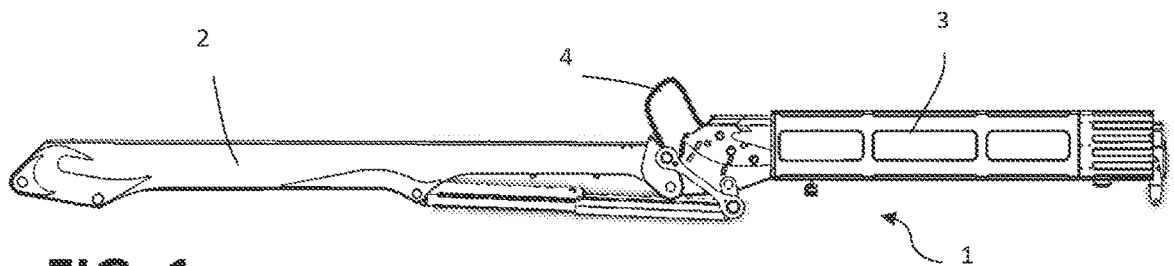
FIGS. 1A-1C are side views of a loading crane according to the prior art in different operative conditions.
Figure 1B:
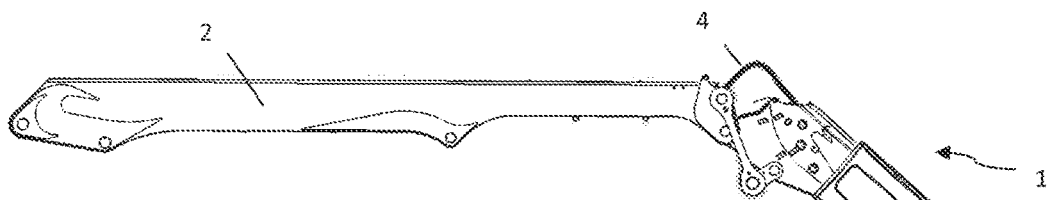
Figure 1C:
Figure 2:
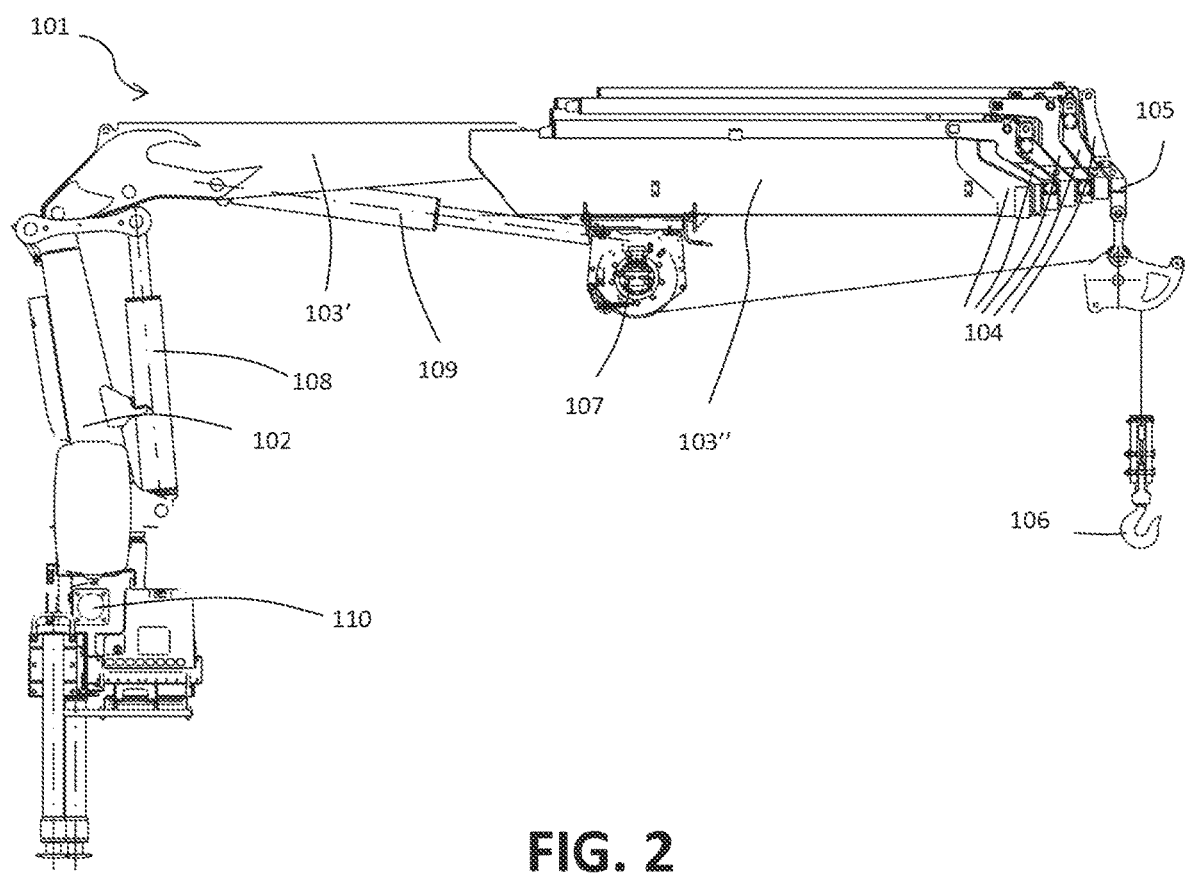
FIG. 2 is a side view of a loading crane according to an embodiment of the invention.
Figure 3A:
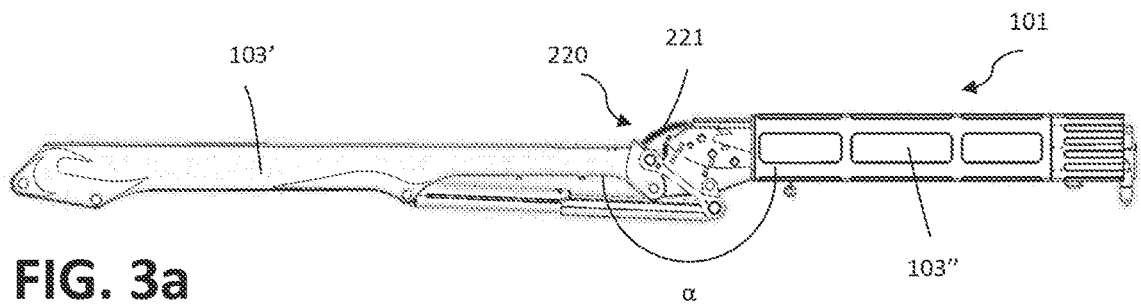
FIGS. 3A-3C are side views of a loading crane according to an embodiment of the invention in different operative conditions.
Figure 3B:
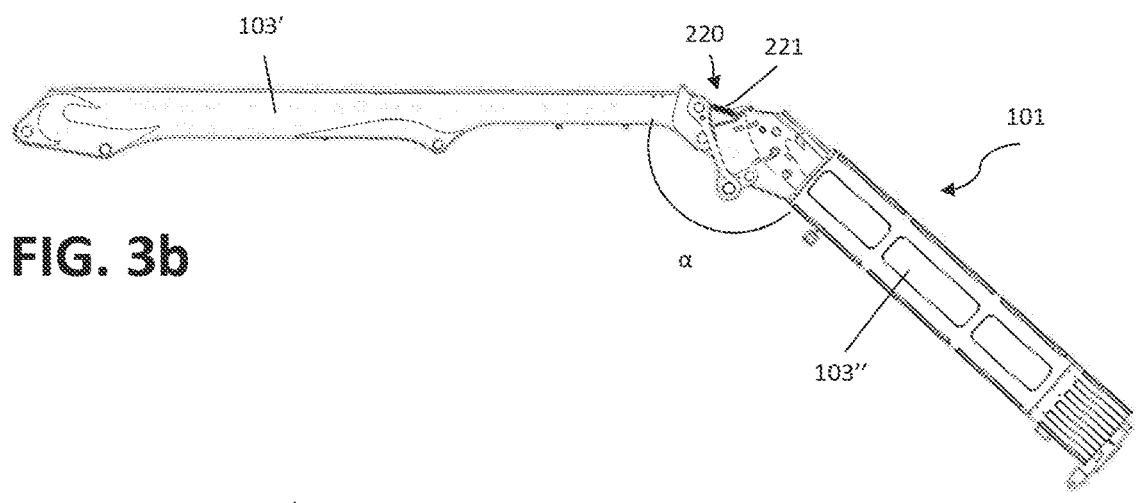
Figure 3C:
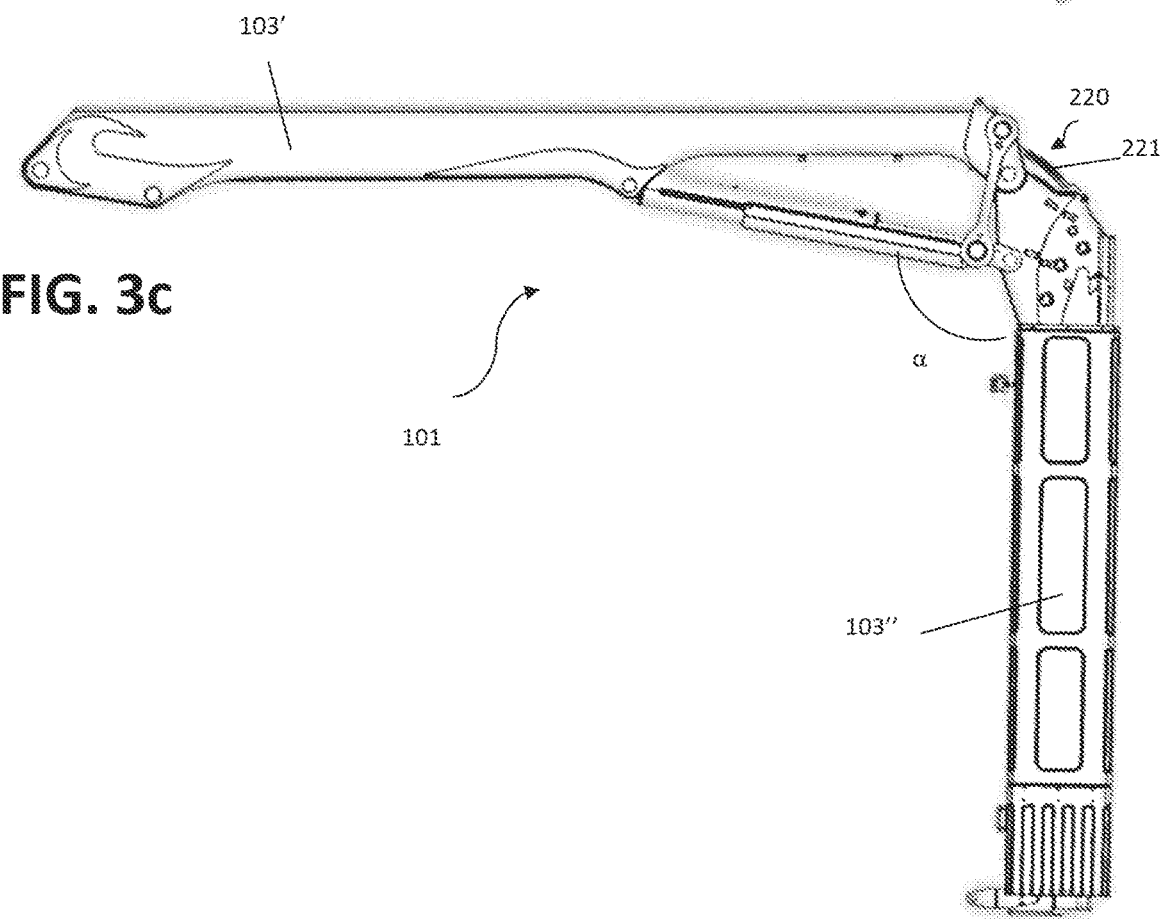

With reference to the attached FIG. 2, it shows an example of a hydraulic loading crane (commonly known also as "loader crane") generally indicated by reference 101.

The crane comprises a plurality of bodies consecutively connected in order to form an open kinematic chain having a plurality of translating and/or rotative degrees of freedom and a plurality of hydraulic actuators for moving said bodies. For example, according to the embodiment of FIG. 2, the crane 101 comprises a column 102 rotatable about its axis, and one or more possibly extendable arms 103', 103". The possibility of extending the arms, if provided, is obtained by a plurality of extensions 104 translatingly movable from each other in order to enable to modify the axial length of a respective arm. In the example of FIG. 2, only the second arm 103" is extendable by moving the extensions 104. In the following description, the first arm 103', without extensions, will be indicated as "main arm", while the second arm 103", provided with the extensions 104, will be indicated as "secondary arm". The free end 105 of the last extension of the secondary arm 103" is commonly indicated as end-effector. A hook 106 movable for example by means of a rope capstan 107 can be provided in correspondence of the end-effector 105.

Assuming for sake of simplicity there is only one extension 104, therefore excluding the motions of the hook 106, the crane 101 has the following degrees of freedom:

1) rotation of the column 102 about its axis;
2) rotation of the main arm 103' with respect to the column 102 about an axis perpendicular to the plane where the column 102 and main arm 103' lie;
3) rotation of the secondary arm 103" with respect to the main arm 103' about an axis perpendicular to the plane on which the main arm 103' and secondary arm 103" lie;

4) translation of the extension 4 with respect to the secondary arm 103".

Consequently, the above-described crane implements an open kinematic chain, with a plurality of bodies successively connected (column, main arm, secondary arm, extensions) and a free end (end-effector).

Such motions can be performed because the crane 101 comprises a plurality of hydraulic actuators, particularly at least one actuator corresponding to a specific degree of freedom. Referring to FIG. 2, a first hydraulic jack 108 moving the main arm 103' with respect to the column 102, a second hydraulic jack 109 moving the secondary arm 103" with respect to the main arm 103', and an actuator 110 for moving the column 102 with respect to a stationary reference are visible. Obviously, further hydraulic actuators (not shown in the figures) will be provided for moving the extensions 104.

The above-cited hydraulic actuators are supplied by and discharge a working fluid, preferably a pressurized oil, by a hydraulic circuit 200 of the crane 101.

For the sake of the description of the arrangement of the hydraulic circuit, reference is illustratively made to the main arm 103' and secondary arm 103" and to the rotation of the secondary arm 103" with respect to the main arm 103'. However, the same features which will be described can find an application also in any two consecutive bodies of the kinematic chain, wherein the secondary body performs translating and/or rotational movements, with respect to the first body receiving the second one in the kinematic chain. Consequently, what will be described can find in the same way an application for example in the column 102 and main arm 103' (wherein the main arm 103' rotates with respect to the column 102), but also in successive extensions 104, which translate from each other.

Therefore, with reference to FIGS. 3A-3C and 4A-4C, they illustrate three different possible relative angular positions between the crane secondary arm 103" and main arm 103', in which they particularly form a relative angle α respectively of 180°, 135° and 90°. The hydraulic circuit 200 comprises a segment 201 associated to the main arm 103', a segment (not shown in the figures) associated to the secondary arm 103" and a joining segment 220 connecting the segment 201 associated to the main arm 103' and the segment associated to the secondary arm 103", at their ends arranged in the interface between the main arm 103' and secondary arm 103" where the relative movement thereof occurs, in this case a relative rotative movement. According to the illustrated example, the joining segment 220 connects a proximal end 202 of the segment 201 associated to the main arm 103' to a proximal end of the segment 201 associated to the main arm 103' to a proximal end of the segment 201 associated to the secondary arm 103". The term "proximal end" in the present description and in the attached claims means an end adjacent (but not necessarily the most adjacent) to the interface between two successive bodies connected to each other and relatively movable from each other, while the term "distal end" means an end at a greater distance (but not necessarily at the greatest distance) from such interface.

Advantageously, the joining segment 220 comprises at least one flexible joining tube 221.

With reference to the segment 201 associated to the main arm 103', it comprises the beforehand cited proximal end 202 (adjacent to the interface with the secondary arm 103") and a distal end 206 (at a distance from the interface with the secondary arm 103") opposite to the proximal end 202.

The segment 201 associated to the main arm 103' comprises at least one sliding rigid tube 203 slidingly translatingly connected to the main arm 103', at least one stationary tube 204 (preferably also rigid, but as an alternative can be also flexible) integrally connected to the main arm 103', and a flexible tube 205 fluidically interconnecting the sliding rigid tube 203 and stationary tube 204.

Each of the above-cited tubes comprises two end openings supplying the working fluid. Particularly:
- the sliding rigid tube 203 comprises a first end opening 203' and a second end opening 203". According to the described embodiment, the first end opening 203' is arranged at the proximal end 202 of the segment 201 of the hydraulic circuit 200;
- the stationary tube 204 comprises a first end opening 204' and a second end opening 204". According to the described embodiment, the second end opening 204" is arranged at the distal end 206 of the segment 201 of the hydraulic circuit 200;
- the flexible tube 205 comprises a first end opening 205' and a second end opening 205". According to the illustrated embodiment, the first end opening 205' of the flexible tube 205 is connected to the second end opening 203" of the sliding rigid tube 203, while the second end opening 205" of the flexible tube 205 is connected to the first end opening 204' of the stationary tube 204.

It is observed that the flexible tube 205, at the first end opening 205' thereof, is translatingly integral with the sliding rigid tube 203 and consequently is movable with it, while, at the second end opening 205" thereof, is stationary and integral with the main arm 103' with the stationary tube 204. In the intermediate segment between the end openings 205' and 205" thereof, the flexible tube 205 is advantageously free, in other words is not constrained to the main arm 103'.

The sliding rigid tube 203 is movable with respect to the main arm 103' between a retracted position (FIG. 4A) and an advanced position (FIG. 4C), each corresponding to a relative position between the main arm 103' and secondary arm 103". Particularly, with reference to the example shown in the figures, the retracted position can correspond to an angle α equal to 180° (FIG. 3A), while the advanced position can correspond to an angle α equal to 90° (FIG. 3C) between the main arm 103' and secondary arm 103". Obviously, the retracted and advanced positions of the sliding rigid tube 203 can, as an alternative, correspond to different angles α formed between the main arm 103' and secondary arm 103".

Figure 4A:
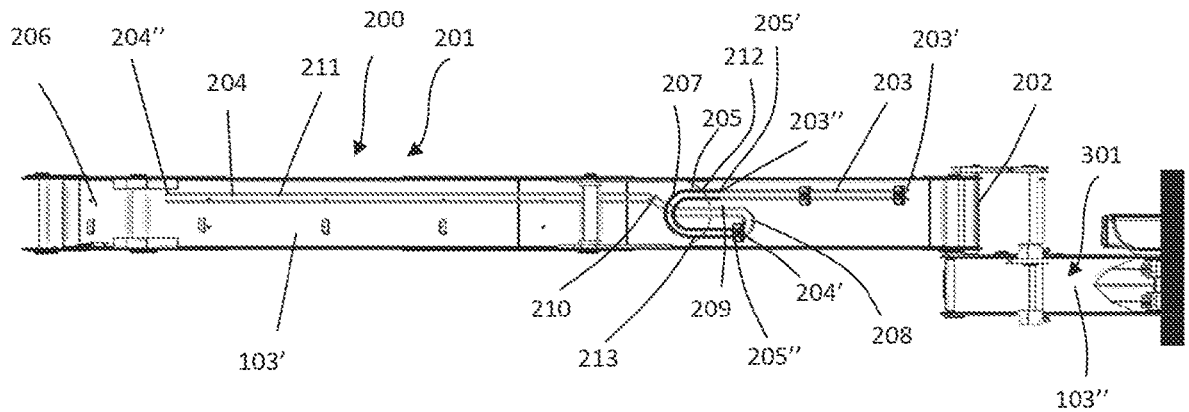
FIGS. 4A-4C are side views of features of the loading crane in the operative conditions respectively shown in FIGS. 3A-3C.
Figure 4B:
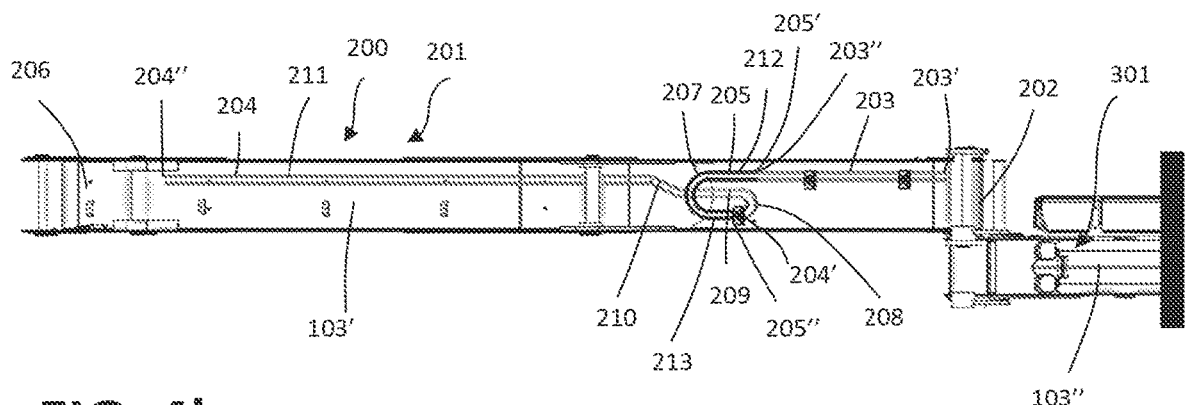
Figure 4C:
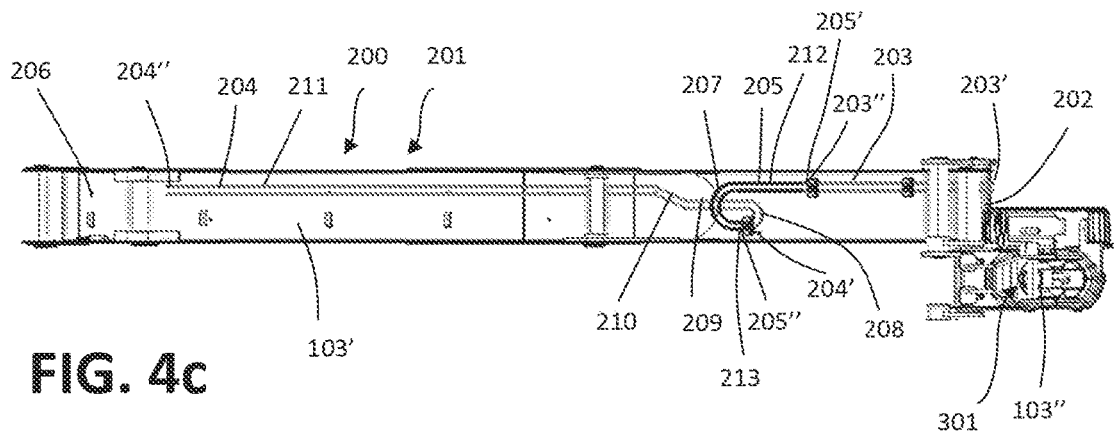

The sliding rigid tube 203 and stationary tube 204 are arranged so that their respective second end opening 203" and first end opening 204' are not aligned and face the same end of the main arm 103' (in the example, they both face the distal end 206) and, consequently, the flexible tube 205 takes a configuration comprising a curvilinear segment 207 between its end openings 205' and 205", wherein, advantageously, its concavity faces the end opposite to the end which the second end opening 203" of the sliding rigid tube 203 and the first end opening 204' of the stationary tube 204 face (in the example of FIGS. 4A-4C, the concavity faces the proximal end 202 of the main arm 103').

According to an embodiment, the sliding rigid tube 203 and stationary tube 204 are at least predominantly aligned with the longitudinal axis of the main arm 103' (not shown in the figures) and are parallel to each other. Preferably, in order to obtain the above-described configuration, at least one of the stationary tube 204 and sliding rigid tube 203 comprises a shaped portion. For example, with reference to the embodiment in FIGS. 4A-4C, starting from the first end opening 204' facing the distal end 206 of the main arm 103', the stationary tube 204 can comprise:

- a first curvilinear segment 208 having a concavity opposite to the concavity of the curvilinear segment 207 of the flexible tube 204;
- a first rectilinear segment 209, preferably parallel to the longitudinal axis of the main arm 103';
- a second rectilinear segment 210 oblique to the longitudinal axis of the main arm 103';
- a third rectilinear segment 211, preferably parallel to the longitudinal axis of the main arm 103', terminating at the second end opening 204".

Advantageously, the curvilinear segment 207 of the flexible tube 205 takes a shape according to an arc of a circle having a substantially constant radius, having an amplitude of about 180°, which translates by maintaining substantially unaltered its shape due to the translations of the sliding rigid tube 203 between the retracted and the advanced positions. Particularly, if the sliding rigid tube 203 is in the retracted position (FIG. 4A), a first rectilinear segment 212 of the flexible tube 205 is connected to the sliding rigid tube 203 and a second rectilinear segment 213 of the flexible tube 205 is connected to the stationary tube 204, and the curvilinear segment 207 is arranged between the rectilinear segments 212 and 213. As the sliding rigid tube 203 gradually translates from the retracted position (in FIG. 4A), transitioning from an intermediate position (FIG. 4B) to an advanced position (FIG. 4C), the first rectilinear segment 212 of the flexible tube 205 tends to shorten because the corresponding flexible tube 205 portion flips over and becomes part of the curvilinear segment 207, while the second rectilinear segment 213 tends to lengthen since the corresponding flexible tube 205 portion leaves the curvilinear segment 207. Consequently, during these movements, the flexible tube 205 keeps the curvilinear segment 207 substantially with the same shape and the same orientation. Such curvilinear segment 207 moves in the same direction as the one of the sliding rigid tube 203.

Due to the above-described arrangement of the segment 201 of the hydraulic circuit 200, it is possible to prevent the flexible joining tubes 221 connecting the main arm 103' and secondary arm 103", in certain relative positions of these, from taking bulky configurations thanks to the movement of the sliding rigid tube 204 and consequently the flexible joining tubes 221 can maintain a limited length.

Analogously, by suitably positioning the segment 201 of the hydraulic circuit 200, it is possible to prevent the flexible tube 205 from also becoming an obstacle. For example, according to the embodiment illustrated in the figures, the segment 201 can be arranged below the main arm 103'.

Moreover, it is observed that the described configuration of the segment 201 can be reproduced in further segments of the hydraulic circuit. For example, in the embodiment of FIGS. 4A-4C, it is shown a further segment 301 of the hydraulic circuit 200 configured analogously to the segment 201. Segments 201 and 301 can be for example used for supplying and returning the working fluid.

Moreover, it is observed that, as already said, despite it was made illustratively reference to the main arm 103' and secondary arm 103", the described arrangement of the segment 201 can be provided, as an alternative or as an addition, in any body of the kinematic chain of the crane which performs any movement with respect to a preceding body. For example, with reference to the relative rotations, the segment 201 can be provided in the column 102, wherein the main arm 103' is rotatable with respect to the column 102.

Lastly, it is observed that the described configuration can be equally used also in case of relative translating movements. For example, the segment 201 of the hydraulic circuit 200 can be provided in an extension of a pair of extensions, wherein a second extension is capable of translating with respect to a first extension. Consequently, the translations of the sliding rigid tube 203 are determined by relative translations (of the extensions) and not by relative rotations (as the ones described with reference to the example of the secondary arm 103" and main arm 103').

A person skilled in the art in order to meet specific contingent needs can introduce many additions, changes, or substitutions of elements with other operatively equivalent ones to the described embodiments, without falling out of the scope of the attached claims.

What is claimed is:

1. A loading crane comprising:
    an articulated arm, comprising at least one first and one second bodies successively connected in order to form an open kinematic chain, wherein the second body is translatingly and/or rotatably movable with respect to the first body;
    a hydraulic circuit adapted to convey a working fluid for actuating the articulated arm;
    wherein said hydraulic circuit comprises a segment associated to one of the first and second bodies comprising:
        at least one sliding rigid tube slidingly translatingly connected to the body to which the segment of the hydraulic circuit is associated;
        at least one stationary tube integrally connected to the body to which the segment of the hydraulic circuit is associated;
        a flexible tube fluidically interconnecting the sliding rigid tube and the stationary tube; and
    wherein said hydraulic circuit further comprises a further segment associated to the other of the first and second bodies and a joining segment comprising at least one joining flexible tube fluidically interconnecting said further segment of the hydraulic circuit and said at least one sliding rigid tube; and
    wherein said joining segment is arranged at the interface between the first body and the second body where the relative movement thereof occurs and connects a proximal end of the segment associated to the one of the first body and of the second body to a proximate end of the further segment associated to the other of the first body and of the second body.

2. The loading crane according to claim 1, wherein said segment of the hydraulic circuit is associated to said first body.

3. The loading crane according to claim 1, wherein said at least one sliding rigid tube is movable between a retracted position and an advanced position, each corresponding to a specific relative position between the first and the second bodies.

4. The loading crane according to claim 1, wherein the flexible tube is fluidically connected to a second end opening of the at least one sliding rigid tube and to a first end opening of the at least one stationary tube, wherein the at least one sliding rigid tube and the at least one stationary tube are arranged and shaped so that the second end opening of the at least one sliding rigid tube and the first end opening of the at least one stationary tube are not aligned and the flexible tube takes a shape according to a shape comprising a curvilinear segment.

5. The loading crane according to claim 4, wherein the curvilinear segment of the flexible tube takes a shape according to an arc of a circle having a radius substantially constant with an amplitude of about 180°.

6. The loading crane according to claim 4, wherein the flexible tube, due to the translations of the at least one sliding rigid tube, changes its shape so that the curvilinear segment of the flexible tube translates, by maintaining substantially unchanged its shape and its orientation.

7. The loading crane according to claim 1, wherein the at least one sliding rigid tube and the at least one stationary tube are at least mostly aligned with the longitudinal axis of the body to which the segment of the hydraulic circuit is associated.

8. The loading crane according to claim 1, wherein said at least one stationary tube is rigid.

9. The loading crane according to claim 1, wherein said articulated arm comprises a column rotatable about its axis, a main arm rotatable about the column, a secondary arm rotatable about the main arm, wherein said main and secondary arms form said first and second bodies of the kinematic chain.

10. The loading crane according to claim 1, wherein said articulated arm comprises a column rotatable about its axis and a main arm rotatable about the column, wherein said column and said main arm form said first and second bodies of the kinematic chain.

11. The loading crane according to claim 1, wherein said articulated arm comprises a column rotatable about its axis, a main arm rotatable about the column, a secondary arm rotatable about the main arm and at least one extension translatingly extendable with respect to the secondary arm, wherein said secondary arm and said at least one extension form said first and second bodies of the kinematic chain.

* * * * *